US011888250B2

(12) United States Patent
Jo et al.

(10) Patent No.: US 11,888,250 B2
(45) Date of Patent: Jan. 30, 2024

(54) TERMINAL-EQUIPPED WIRE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Takahito Jo, Mie (JP); Yasushi Saito, Mie (JP); Tomoyuki Sakata, Mie (JP); Masaaki Tabata, Mie (JP); Teruo Hara, Mie (JP); Shunya Takeuchi, Mie (JP); Hideki Matsunaga, Mie (JP); Keisuke Teramoto, Mie (JP)

(73) Assignees: AUTONETWORKS TECHNOLOGIES, Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 87 days.

(21) Appl. No.: 17/633,274

(22) PCT Filed: Aug. 5, 2020

(86) PCT No.: PCT/JP2020/030045
§ 371 (c)(1),
(2) Date: Feb. 7, 2022

(87) PCT Pub. No.: WO2021/029299
PCT Pub. Date: Feb. 18, 2021

(65) Prior Publication Data
US 2022/0352665 A1 Nov. 3, 2022

(30) Foreign Application Priority Data
Aug. 9, 2019 (JP) ................................ 2019-147258

(51) Int. Cl.
*H01R 13/03* (2006.01)
*H01R 4/18* (2006.01)
(Continued)

(52) U.S. Cl.
CPC ............... *H01R 13/03* (2013.01); *H01R 4/18* (2013.01); *H01R 4/28* (2013.01); *H01R 11/11* (2013.01)

(58) Field of Classification Search
None
See application file for complete search history.

(56) References Cited

U.S. PATENT DOCUMENTS 4,413,872 A 11/1983 Rudy, Jr. et al.
4,508,409 A * 4/1985 Cherry ................ H01R 4/2491 403/311
(Continued)

FOREIGN PATENT DOCUMENTS

DE 202016104726 U1 9/2017
JP 2012146431 A * 8/2012 ............... H01B 5/08
(Continued)

OTHER PUBLICATIONS

International Search Report dated Nov. 17, 2020 for WO 2021/029299 A1 (6 pages).

*Primary Examiner* — Ross N Gushi
(74) *Attorney, Agent, or Firm* — Venjuris, P.C.

(57) ABSTRACT

A terminal-equipped wire is provided with a wire including a conductor, a terminal to be connected to the conductor, and a shell to be mounted on the terminal. The terminal includes a grip portion for sandwiching the conductor. The shell includes a pressing portion for pressing at least a part of the grip portion toward the conductor. The grip portion has a
(Continued)

Sn—Ni alloy layer. The Sn—Ni alloy layer includes locally projecting protrusions. The protrusions bite into the conductor.

5 Claims, 13 Drawing Sheets

(51) Int. Cl.
*H01R 4/28* (2006.01)
*H01R 11/11* (2006.01)

(56) References Cited

U.S. PATENT DOCUMENTS

| | | | | |
|---|---|---|---|---|
| 11,128,069 | B2 * | 9/2021 | Yagyu .................. | H01R 12/585 |
| 2013/0092437 | A1 | 4/2013 | Yoshinaga | |
| 2017/0149191 | A1 * | 5/2017 | Horn ........................ | C25D 5/18 |
| 2020/0036125 | A1 | 1/2020 | Watanabe | |
| 2020/0169020 | A1 | 5/2020 | Nozaki et al. | |

FOREIGN PATENT DOCUMENTS

| | | | |
|---|---|---|---|
| JP | 2014-187015 | A | 10/2014 |
| JP | 2016-071951 | A | 5/2016 |
| JP | 2017-220392 | A | 12/2017 |
| JP | 2018-190533 | A | 11/2018 |

* cited by examiner

TERMINAL-EQUIPPED WIRE

CROSS REFERENCE TO RELATED APPLICATIONS

This application is a national phase of PCT application No. PCT/JP2020/030045, filed on 5 Aug. 2020, which claims priority from Japanese patent application No. 2019-147258, filed on 9 Aug. 2019, all of which are incorporated herein by reference.

TECHNICAL FIELD

The present disclosure relates to a terminal-equipped wire.

This application claims a priority of Japanese Patent Application No. 2019-147258 filed on Aug. 9, 2019, the contents of which are all hereby incorporated by reference.

BACKGROUND

In a moving body such as an automotive vehicle, terminal-equipped wires for transmitting signals are used. The terminal-equipped wire includes a wire having a conductor and a terminal to be electrically connected to the conductor.

The conductor of the wire and the terminal are often connected by crimping. For example, a terminal described in Patent Document 1 includes a crimping portion (wire barrel) in the form of an open barrel to be crimped to a conductor. In this configuration, the conductor is arranged inside the wire barrel and the conductor and the terminal are mechanically and electrically connected by crimping the wire barrel.

PRIOR ART DOCUMENT

Patent Document

Patent Document 1: JP 2019-021405 A

SUMMARY OF THE INVENTION

Problems to be Solved

The present disclosure is directed to a terminal-equipped wire with a wire including a conductor, a terminal to be connected to the conductor, and a shell to be mounted on the terminal, wherein the terminal includes a grip portion for sandwiching the conductor, the shell includes a pressing portion for pressing at least a part of the grip portion toward the conductor, the grip portion has a Sn—Ni alloy layer, the Sn—Ni alloy layer includes locally projecting protrusions, and the protrusions bite into the conductor.

DETAILED DESCRIPTION TO EXECUTE THE INVENTION

Technical Problem

Figure 1:
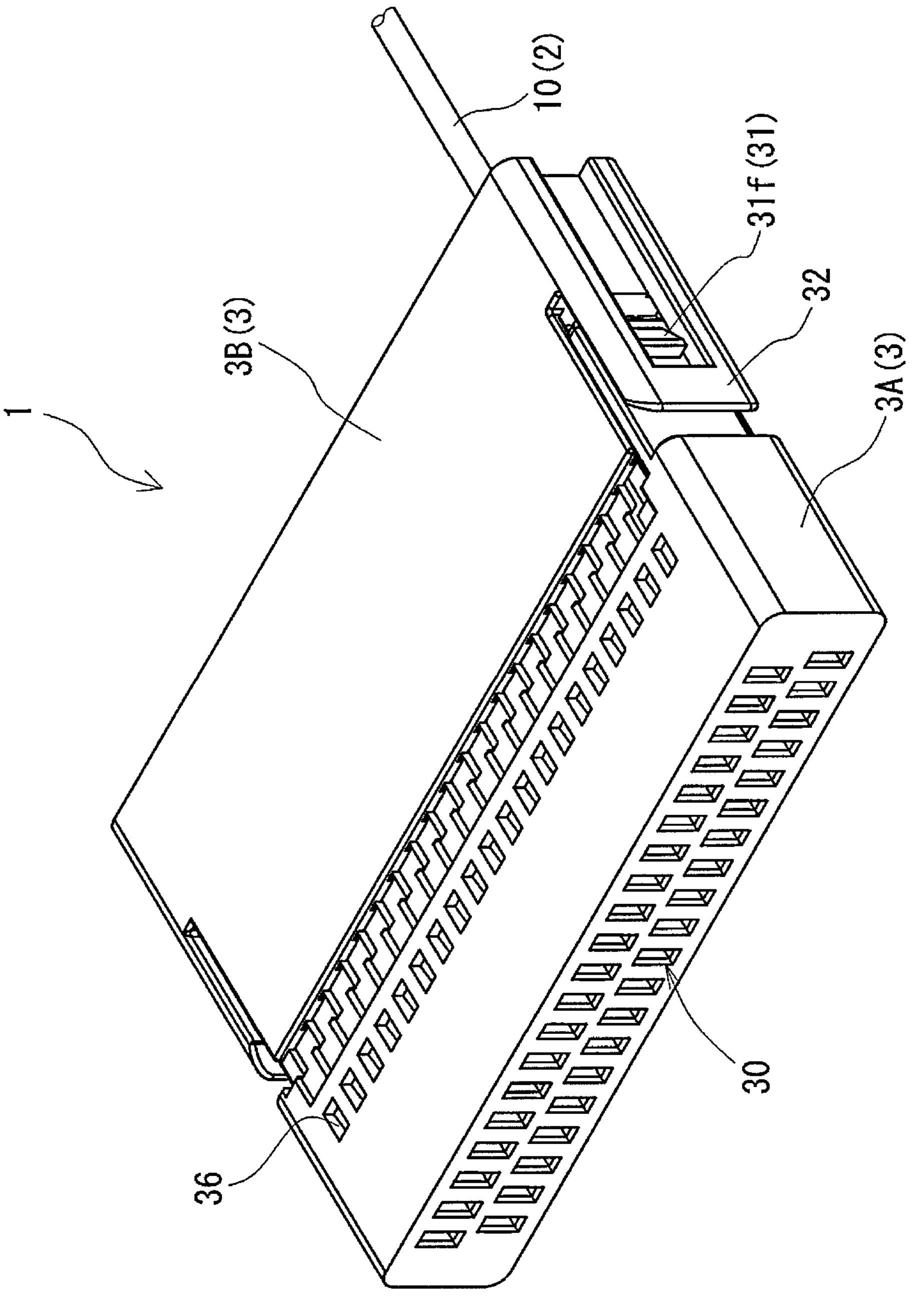
FIG. 1 is a schematic configuration diagram of a connector assembly described in one embodiment.

With the electrification of automotive vehicles of recent years, the number of terminal-equipped wires to be installed in an automotive vehicle tends to increase. Thus, a connector bundling a plurality of terminal-equipped wires together tends to be enlarged. Since a connector installation space is limited, there is a need to make the connector as small as possible.

It is being studied to reduce a wire diameter of a terminal-equipped wire for the miniaturization of a connector. In this case, it is important to ensure connection strength between a conductor of the wire and a terminal. This is because vibration is applied to a connected part of the conductor of the wire and the terminal, particularly in an automotive vehicle or the like.

Accordingly, one object of the present invention is to provide a terminal-equipped wire excellent in connection strength between a conductor of a wire and a terminal.

Effect of Present Disclosure

A terminal-equipped wire of the present disclosure is excellent in connection strength between a conductor of a wire and a terminal.

DESCRIPTION OF EMBODIMENTS OF PRESENT DISCLOSURE

The present inventors diligently studied a configuration for improving connection strength between a conductor of a wire and a terminal. As a result, it was found out that connection strength, which cannot be obtained by merely sandwiching the conductor, could be obtained by adopting a configuration for constantly sandwiching the conductor with a strong force. It was also found out that the connection strength between the conductor and the terminal was improved by providing a Sn—Ni alloy layer including protrusions in a part of the terminal to be brought into contact with the conductor. Based on this finding, the present inventors completed the terminal-equipped wire of the present disclosure. First, embodiments of the present disclosure are listed and described.

<1> A terminal-equipped wire according to an embodiment is provided with a wire including a conductor, a terminal to be connected to the conductor, and a shell to be mounted on the terminal, wherein the terminal includes a grip portion for sandwiching the conductor, the shell includes a pressing portion for pressing at least a part of the grip portion toward the conductor, the grip portion has a Sn—Ni alloy layer, the Sn—Ni alloy layer includes locally projecting protrusions, and the protrusions bite into the conductor.

In the above configuration, the grip portion of the terminal pressed by the pressing portion of the shell continues to be pressed against the conductor. Accordingly, the grip portion continues to sandwich the conductor with a strong force. Further, in the above configuration, the grip portion of the terminal is formed with the Sn—Ni alloy layer including the protrusions. Since the Sn—Ni alloy layer is very hard, if the grip portion is strongly pressed against the terminal by the shell, the protrusions of the Sn—Ni alloy layer bite into the conductor. As a result, even if the wire provided in the terminal-equipped wire according to the embodiment is pulled, the conductor does not easily come out from the terminal. A holding force, which is a force for holding the conductor in the terminal-equipped wire according to this embodiment, is larger than a holding force in a conventional terminal-equipped wire in which a wire is gripped by a wire barrel.

<2> As one mode of the terminal-equipped wire according to the embodiment, the Sn—Ni alloy layer contains $Ni_3Sn_4$.

$Ni_3Sn_4$ has a very high hardness. This hardness is higher than that of a material generally used as a conductor of a wire such as a Cu alloy. Accordingly, the protrusions of the Sn—Ni alloy layer containing $Ni_3Sn_4$ easily bite into the conductor. As a result, the holding force for the conductor in the terminal-equipped wire is improved.

<3> As one mode of the terminal-equipped wire according to the embodiment, the conductor is a single core wire.

In a conductor composed of a plurality of cores, the respective cores easily move when the conductor is sandwiched by the grip portion. On the other hand, the conductor composed of the single core wire hardly moves when being sandwiched by the grip. Therefore, the conductor composed of the single core wire is firmly sandwiched by the grip.

<4> As one mode of the terminal-equipped wire according to the embodiment, the conductor is made of Cu—Sn alloy or Cu—Ag alloy.

The Cu—Sn alloy is excellent in fixing force to the terminal. The Cu-AG alloy is excellent in strength and excellent in handleability in a vehicle.

<5> As one mode of the terminal-equipped wire according to the embodiment, the shell includes a tubular portion for accommodating the grip portion inside, and the pressing portion formed on the tubular portion.

The shell formed into a tubular shape is hard to deform. Therefore, a force of the grip portion of the terminal for sandwiching the conductor is easily maintained over a long period of time by the tubular shell.

<6> As one mode of the terminal-equipped wire according to <5> described above, the grip portion includes a first plate-like piece and a second plate-like piece facing each other across the conductor, the pressing portion includes a first projecting portion and a second projecting portion projecting toward an inner peripheral side of the tubular portion, the first projecting portion presses the first plate-like piece toward the second plate-like piece, and the second projecting portion presses the second plate-like piece toward the first plate-like piece.

In the above configuration, the conductor is sandwiched at positions symmetrical across a center of the conductor on the outer peripheral surface of the conductor by the first and second plate-like pieces constituting the grip portion. Since the position of the conductor in the grip portion hardly changes, the holding force for the conductor by the grip is largely improved. Further, in the above configuration, the first and second projecting portions are respectively configured to press the first and second plate-like pieces. Thus, a force of the first plate-like piece for pressing the conductor and a force of the second plate-like piece for pressing the conductor are easily balanced. This configuration is also a reason for largely improving the holding force for the conductor by the grip portion.

Details of Embodiment of Present Disclosure

Hereinafter, a specific example of a terminal-equipped wire according to an embodiment of the present disclosure is described on the basis of the drawings. The same components are denoted by the same reference signs in figures. Note that the present invention is not limited to these illustrations and is intended to be represented by claims and include all changes in the scope of claims and in the meaning and scope of equivalents.

Embodiment

In one embodiment, a terminal-equipped wire 10 of this example is described, using a connector assembly 1 shown in FIG. 1 as an example. The connector assembly 1 includes a plurality of terminal-equipped wires 10 and one connector 3. Only one terminal-equipped wire 10 is shown in FIG. 1 for the convenience of description. This terminal-equipped wire 10 includes a wire 2 and a terminal 4 (FIG. 6) to be mounted on the tip of the wire 2. The terminal 4 shown in this example is a female terminal. Therefore, the connector 3 of this example is a female connector. Unlike this example, the terminal 4 may be a male terminal.

<<Connector>>

Figure 2:
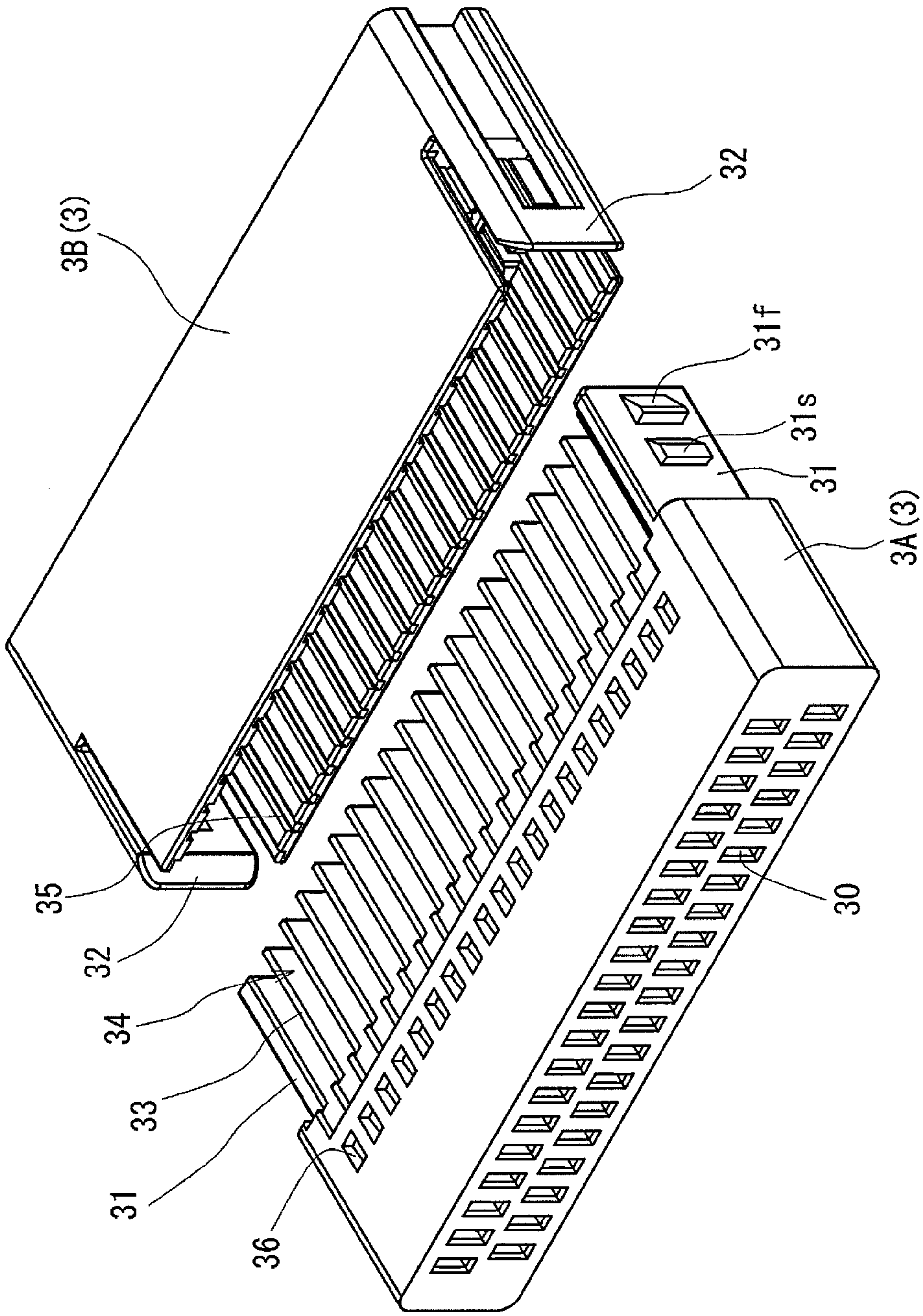
FIG. 2 is an exploded perspective view of a connector provided in the connector assembly described in the one embodiment.

An unillustrated male connector is connected to the connector 3. As shown in FIG. 2, the connector 3 is configured by mechanically assembling a front housing 3A and a rear cover 3B. The front housing 3A includes a plurality of insertion holes 30 into which the tips of male terminals of the unillustrated male connector are inserted. Further, a plurality of cavities 34 defined by partition walls 33 are formed on a side opposite to the insertion holes 30 in the front housing 3A. Each cavity 34 is connected to each insertion hole 30.

The rear cover 3B is formed with wire insertion holes, through which the wires 2 are passed, in an unillustrated rear end part. A plurality of slide grooves 35 are arranged in the inner peripheral surface of the rear cover 3B on the side of the front housing 3A. The partition walls 33 of the front housing 3A are fit into the slide grooves 35 to slide.

The front housing 3A and the rear cover 3B of this example are engaged by a two-stage snap fit structure. The snap fit structure is composed of housing-side engaging portions 31 formed on both widthwise end parts of the front housing 3A and cover-side engaging portions 32 formed on both widthwise end parts of the rear cover 3B. The housing-side engaging portions 31 are plate-like members provided on both widthwise ends of the front housing 3A. The plate-like member includes a first projection 31*f* and a second projection 31*s* on the outer surface thereof. The first projection 31*f* is arranged closer to the rear end of the front housing 3A than the second projection 31*s*. On the other hand, the cover-side engaging portions 32 are gate-shaped engaging pieces. Accordingly, when the rear cover 3B is fit to the front housing 3A, the first projections 31*f* are first engaged with through holes of the cover-side engaging portions 32. If the rear cover 3B is further pushed to the front housing 3A, the cover-side engaging portions 32 ride over the first projections 31*f* and the second projections 31*s* are engaged with the through holes of the cover-side engaging portions 32.

<<Wire>>

Figure 6:
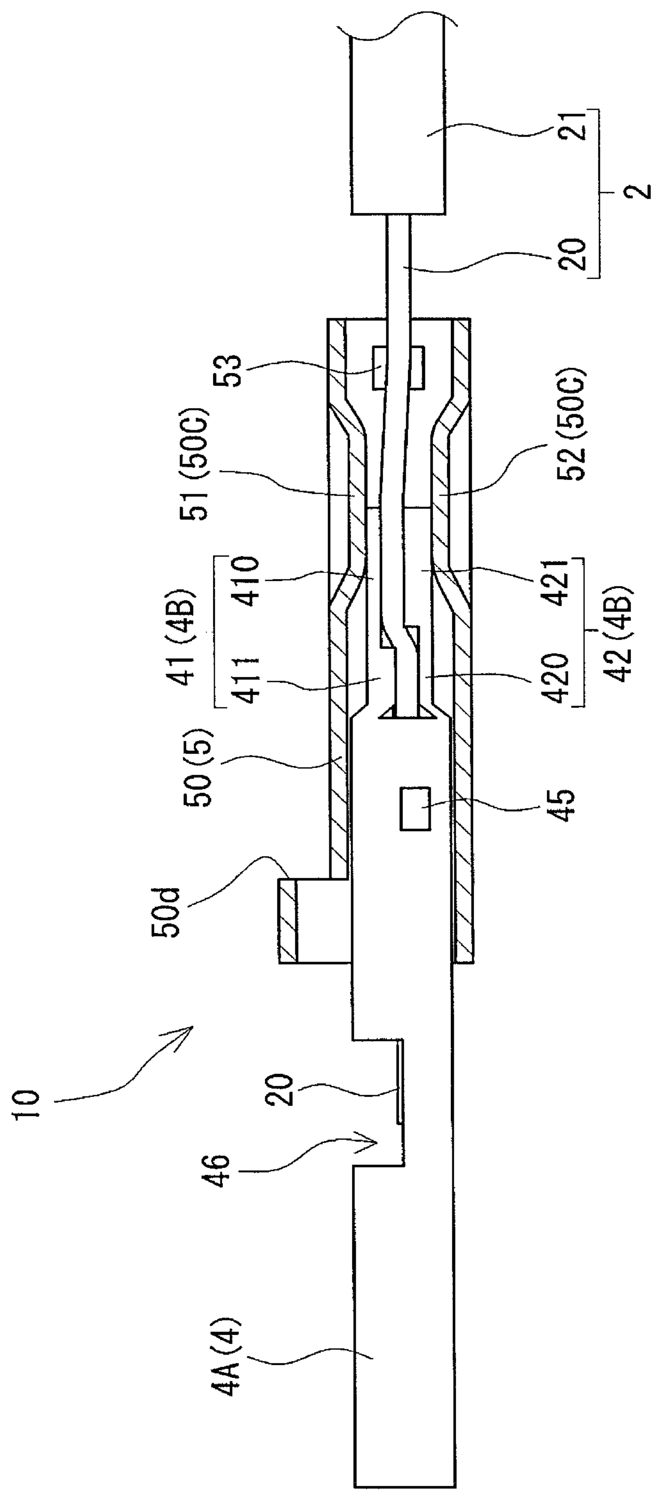
FIG. 6 is a partial longitudinal section of the terminal-equipped wire described in the one embodiment.

As shown in FIG. 6, the wire 2 includes a conductor 20 and an insulation layer 21 formed on the outer periphery of the conductor 20. The insulation layer 21 is stripped in an end part of the wire 2 to expose the core 20. The exposed conductor 20 is mechanically and electrically connected to the terminal 4 to be described later.

The conductor 20 may be a single core wire or may be a stranded wire. The conductor 20 of this example is a single core wire. A nominal cross-sectional area of the single core wire is not particularly limited, but is, for example, 0.13 $mm^2$ or less. A single core wire having a nominal cross-sectional area of 0.05 $mm^2$ can be cited as a thinner single core wire. In the terminal-equipped wire 10 according to the embodiment of the present disclosure, the conductor 20 thinner than those of conventional terminal-equipped wires is adopted. Even such a thin conductor 20 is firmly held in the terminal 4 according to the structure of the terminal-equipped wire 10 of the embodiment. This is because protrusions formed on a Sn—Ni alloy layer of a grip portion provided in the terminal 4 bite into the conductor 20 as described later.

The conductor 20 before being connected to the terminal 4 includes a part containing at least copper (Cu). For example, the conductor 20 is made of Cu or Cu alloy. A Cu—Ag alloy, Cu—Sn alloy, Cu—Fe alloy or the like can be cited as the Cu alloy. The Cu—Sn alloy is excellent in fixing force to the terminal. The Cu—Ag alloy is excellent in strength and excellent in handleability in a vehicle. A tin (Sn) layer may be formed on the outermost surface of the conductor 20 before being connected to the terminal 4. On the other hand, the insulation layer 21 is, for example, made of insulating resin such as polyvinyl chloride or polyethylene.

<<Terminal>>

Figure 3:
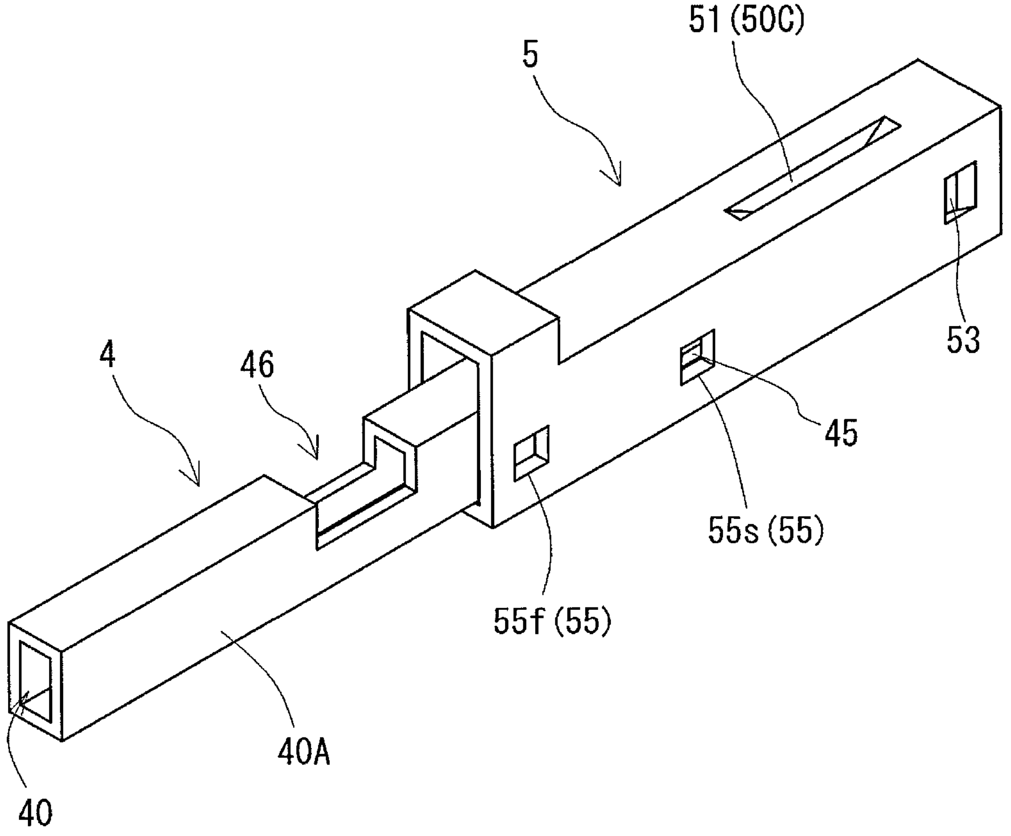
FIG. 3 is a schematic perspective view of a set of a terminal and a shell described in the one embodiment.

The terminal 4 is used as a set with a shell 5 to be mounted on the terminal 4 (FIG. 3). The terminal 4 of this example is obtained by press-working one plate material. If the nominal cross-sectional area of the conductor 20 is 0.13 $mm^2$, a thickness of the plate material is preferably 0.05 mm or more and 0.20 mm or less. If the thickness of the plate material is 0.05 mm or more, the mechanical strength of the terminal 4 can be ensured. If the thickness of the plate material is 0.20 mm or less, the enlargement of the terminal 4 is avoided. A more preferable thickness of the plate material is 0.1 mm or more and 0.15 mm or less.

The terminal 4 before being connected to the conductor 20 includes a base material excellent in conductivity and a Sn layer formed on the outermost surface of the base material. Cu or Cu alloy can be, for example, cited as the base material. Further, Sn, Ag or the like may be plated on the outermost surface. Ni (nickel) or Ni alloy may be plated as a plating underlayer.

Figure 4:
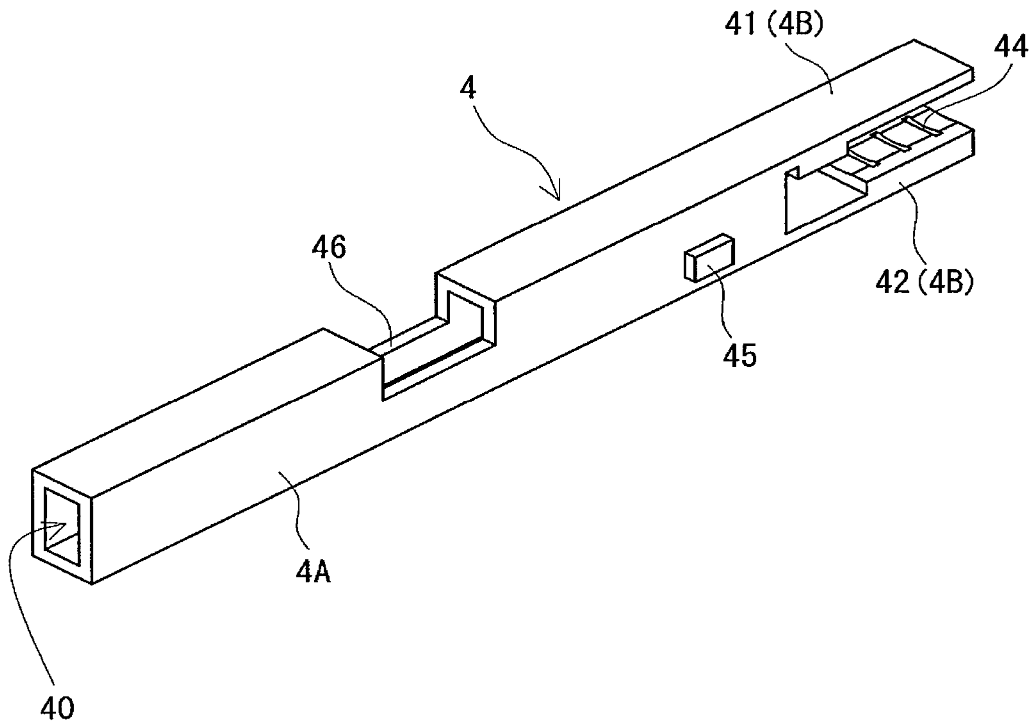
FIG. 4 is a schematic perspective view of the terminal described in the one embodiment.

As shown in FIG. 4, the terminal 4 includes a terminal connecting portion 4A formed into a tubular shape and a grip portion 4B integrated with a rear end part of the terminal connecting portion 4A. The grip portion 4B is a part of the terminal 4 to be electrically connected to the conductor 20.

The terminal connecting portion 4A includes an insertion hole 40 on the tip thereof. The terminal 4 is arranged inside the cavity 34 of the connector 3. Accordingly, the insertion hole 40 of the terminal 4 is arranged substantially coaxially with the insertion hole 30 of the connector 3.

The terminal connecting portion 4A includes a through window 46 in a longitudinal intermediate part thereof. The through window 46 is formed by cutting an upper half of the terminal connecting portion 4A. This through window 46 is located at a position corresponding to a through window 36 of the connector 3. Accordingly, when the terminal 4 is inserted into the cavity 34 of the connector 3 and the front end of the terminal 4 is stopped in contact with a step inside the cavity 34, the through window 46 of the terminal 4 is exposed inside the through window 36 of the connector 3. These through windows 36, 46 are used to visually confirm from the outside of the connector 3 whether or not the conductor 2 is inserted in the terminal 4.

Terminal-side engaging portions 45 are formed on side surfaces of the terminal connecting portion 4A near the grip portion 4B. In FIG. 4, only the terminal-side engaging portion 45 formed on one side surface is shown, but the terminal-side engaging portion 45 is also formed on the other side surface hidden on a back side of FIG. 4. The terminal-side engaging portions 45 of this example are projections to be engaged with shell-side engaging portions 55 of the shell 5 to be described later.

The grip portion 4B of this example includes a first plate-like piece 41 and a second plate-like piece 42 facing each other across the conductor 20. The first plate-like piece 41 is integrally formed to an upper surface part of the terminal connecting portion 4A. The second plate-like piece 42 is integrally formed to a lower surface part of the terminal connecting portion 4A.

As shown in FIG. 6, the first plate-like piece 41 includes a first thin portion 410 and a first thick portion 411. In the first plate-like piece 41, the first thin portion 410 is arranged on a tip side (right side in FIG. 6) of the first plate-like piece 41 and the first thick portion 411 is arranged on a base end side (left side in FIG. 6). In this example, the first thick portion 411 is formed by folding the plate material constituting the terminal 4 (see FIG. 7). That is, the first thick portion 411 is about twice as thick as the first thin portion 410.

The second plate-like piece 42 includes a second thin portion 420 and a second thick portion 421. In the second plate-like piece 42, the second thin portion 420 is arranged on a tip side and the second thick portion 421 is arranged on a base end side. The second thick portion 421 is formed by folding the plate material constituting the terminal 4. Accordingly, a thickness of the second thick portion 421 is substantially equal to that of the first thick portion 411, and a thickness of the second thin portion 420 is substantially equal to that of the first thin portion 410.

A surface of the first thin portion 410 on the side of the second plate-like piece 42 and a surface of the second thick portion 421 on the side of the first plate-like piece 41 are provided with recesses along the outer peripheral shape of the conductor 20. Groove-like serrations 44 are formed in the recess as shown in FIG. 4. The shape and number of the serrations 44 can be selected as appropriate. The serrations 44 of this example are grooves having a V-shaped cross-section. There are three serrations 44.

As shown in FIG. 6, the first and second thick portions 411, 421 are shifted in an axial (lateral direction in FIG. 6) of the terminal 4 without overlapping. Accordingly, the conductor 20 sandwiched between the first and second plate-like pieces 41, 42 is bent at a position where the first and second thick portions 411, 421 are separated in a longitudinal direction.

<<Shell>>

The shell 5 is a member for pressing the grip portion 4B of the terminal 4 toward the conductor 20 (FIG. 3). The shell 5 of this example includes a tubular portion 50 to be fit to a rear end side of the terminal 4. The tubular portion 50 accommodates the grip portion 4B of the terminal 4 inside. This tubular portion 50 is formed with a pressing portion 50C for pressing the grip portion 4B toward the conductor 20. As shown in FIG. 6, the pressing portion 50C of this example includes a first projecting portion 51 and a second projecting portion 52. The both projecting portions 51, 52 project into the inside of the tubular portion 50. The first projecting portion 51 of this example is formed by recessing a part of an upper surface part of the tubular portion 50 inwardly of the tubular portion 50. This first projecting portion 51 presses the first plate-like piece 41 toward the second plate-like piece 42. On the other hand, the second projecting portion 52 of this example is formed by recessing a part of a lower surface part of the tubular portion 50 inwardly of the tubular portion 50. The second projecting portion 52 presses the second plate-like piece 42 toward the first plate-like piece 41. The first and second projecting portions 51, 52 are facing each other.

By surrounding the grip 4B from an outer peripheral side thereof by the tubular portion 50, the first and second plate-like pieces 41, 42 can exert forces for sandwiching the conductor 20. In view of this function, the shell 5 is preferably made of high-strength material. For example, the shell 5 is made of SUS, steel or the like. Besides, the shell 5 may be made of high-strength plastic.

Figure 5:
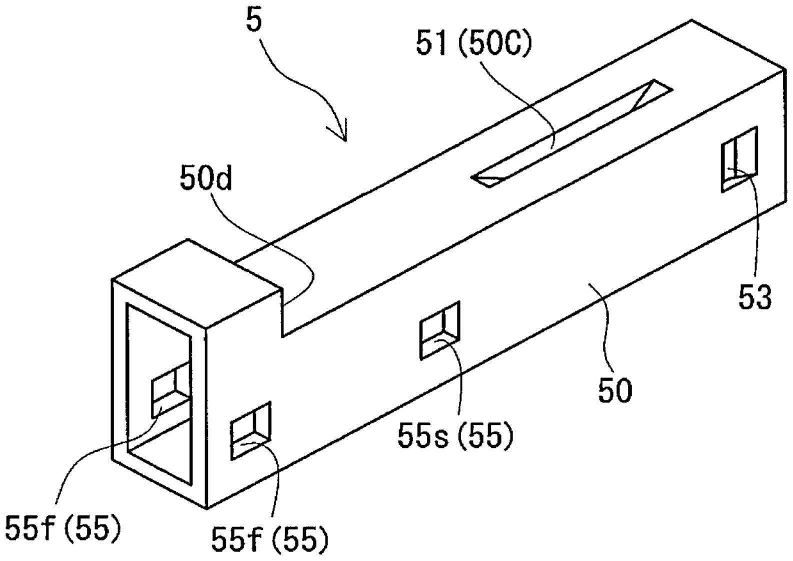
FIG. 5 is a schematic perspective view of the shell described in the one embodiment.

As shown in FIG. 5, the tubular portion 50 includes a step portion 50*d* formed by an outward protruding upper part on a tip side thereof. The step portion 50*d* is a part to be pressed by the rear cover 3B of the connector 3 when the shell 5 is mounted on the terminal 4.

The shell-side engaging portions 55 are formed on side surfaces of the tubular portion 50. The shell-side engaging portion 55 is composed of a first engaging portion 55*f* and a second engaging portion 55*s*. The first and second engaging portions 55*f*, 55*s* of this example are rectangular through holes penetrating through the tubular portion 50 in an in-out direction. The first engaging portion 55*f* is formed on the tip side of the tubular portion 50, and the second engaging portion 55*s* is formed in an intermediate part of the tubular portion 50. Accordingly, when the shell 5 is mounted on the terminal 4, the terminal-side engaging portions 45 provided on the terminal 4 are first engaged with the first engaging portions 55*f*. In this engaged state, the grip portion 4B of the terminal 4 and the pressing portion 50C of the shell 5 are shifted in the longitudinal direction of the terminal 4. If the shell 5 is further pushed toward the terminal 4, the terminal-side engaging portions 45 are disengaged from the first engaging portions 55*f* and engaged with the second engaging portions 55*s*. In this engaged state, the pressing portion 50C is arranged at a position overlapping the grip portion 4B in the longitudinal direction of the terminal 4, and the grip portion 4B is pressed by the pressing portion 50C.

Guide portions 53 are formed in side walls on a rear end side of the tubular portion 50. The guide portions 53 are configured by recessing parts of the side walls of the tubular portion 50 toward an inner peripheral side of the tubular portion 50. As shown in FIG. 6, the guide portions 53 sandwich the conductor 20 in a width direction (depth direction in FIG. 6) of the shell 5. Therefore, the conductor 20 is arranged in a widthwise center of the shell 5, i.e. in a widthwise center of the terminal 4 by the guide portions 53.

A connector module for individually accommodating the terminal 4 inside can be, for example, cited as a shell having a structure different from that of this example. The connector module is composed of a module housing capable of accommodating only one terminal 4 and a module cover for closing an opening of the module housing. In this case, each of the module housing and the module cover may be formed with a pressing portion.

<<Assembling Procedure>>>

An example of an assembling procedure of the connector assembly 1 having the above configuration is described. First, the shell 5 is mounted on the rear end side of the terminal 4 and the terminal-side engaging portions 45 and the first engaging portions 55*f* of the shell-side engaging portions 55 are engaged. At this stage, the grip portion 4B of the terminal 4 and the pressing portion 50C of the shell 5 are shifted in the longitudinal direction of the terminal 4 and the grip portion 4B is not pressed by the pressing portion 50C. These sets of the terminals 4 and the shells 5 are inserted into the cavities 34 of the front housing 3A of the connector 3, the rear cover 3B is mounted on the rear end part of the front housing 3A and the housing-side engaging portions 31 and the first projections 31*f* of the cover-side engaging portions 32 are engaged. At this time, the step portions 50*d* of the shells 5 are pressed by the rear cover 3B and the terminals 4 pressed by the shells 5 are arranged at predetermined positions in the connector 3.

Subsequently, the wires 2 are inserted from behind the rear cover 3B. At that time, the wires 2 are inserted until the conductors 20 can be confirmed through the through windows 36 of the front housing 3A. After the conductors 20 can be confirmed through the through windows 36, the rear cover 3B is pushed toward the front housing 3A to engage the cover-side engaging portions 32 with the second projections 31*s*. At that time, the step portions 50*d* of the shells 5 are pushed by the rear cover 3B and the terminal-side engaging portions 45 are disengaged from the first engaging portions 55*f* and engaged with the second engaging portions 55*s*. As a result, the first and second projecting portions 51, 52 of the shells 5 are respectively arranged at the positions of the first and second plate-like pieces 41, 42 of the terminals 4 and the conductors 20 are sandwiched by the first and second plate-like pieces 41, 42. Since the shells 5 are tubular bodies, which are hard to deform, the both plate-like pieces 41, 42 are continuously pressed against the conductors 2 with strong forces.

<<Compression Rate>>>

Figure 7:
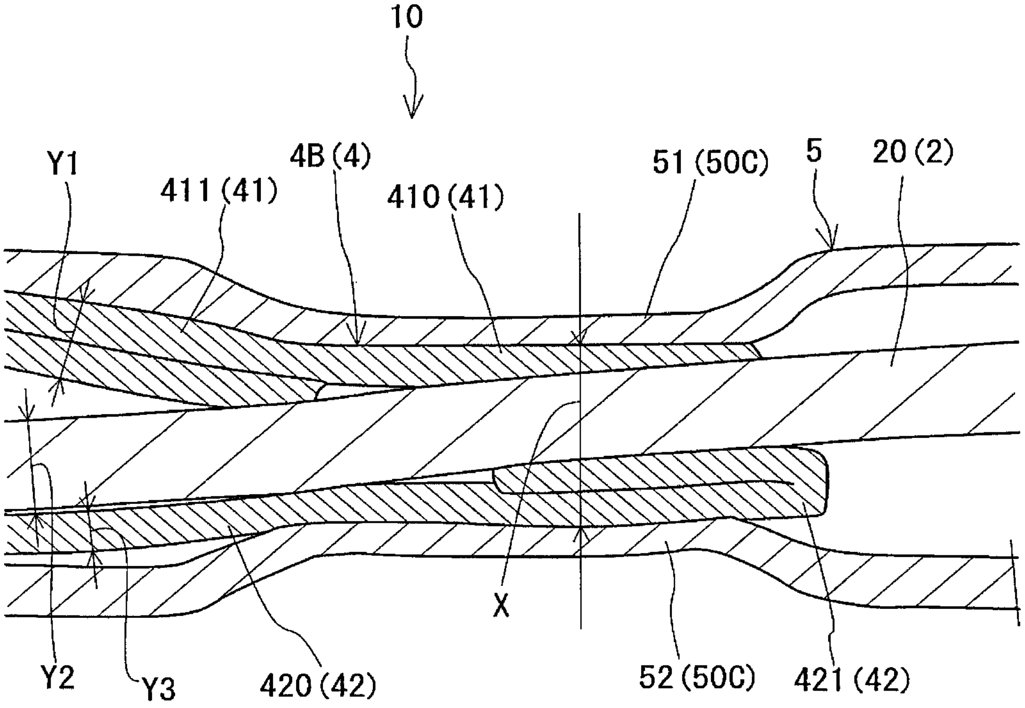
FIG. 7 is a schematic diagram near a pressing portion in the terminal-equipped wire of FIG. 6.

According to the above configuration, the plate-like pieces 41, 42 of the grip portion 4B and the conductor 20 are compressed by the projecting portions 51, 52 of the pressing portion 50C as shown in FIG. 7. A total compression rate of the grip portion 4B and the conductor 20 compressed by the pressing portion 50C is preferably 5% or more and 50% or less. The total compression rate is obtained by $\{(Y-X)/Y\}\times 100$ in a longitudinal cross-section of the terminal-equipped wire 10. X denotes a thickness of a part compressively deformed by the pressing portion 50C, and Y denotes a thickness of a part not compressed by the pressing portion 50C. The compressively deformed part includes both the grip portion 4B and the conductor 20. In an example shown in FIG. 7, a distance between the first and second projecting portions 51 and 52 corresponds to the thickness X of the compressively deformed part. On the other hand, the thickness Y of the part not compressed by the pressing portion 50C is a total thickness of parts not sandwiched by the first and second projecting portions 51, 52. For example, the thickness Y is a total value of a thickness Y1 of the first thick portion 411, a diameter Y2 of the conductor 20 and a thickness Y3 of the second thin portion 420. If the total compression rate is too large, the terminal and the conductor 20 are easily damaged. If the total compression rate is too small, a force for holding the conductor 20 by the terminal 4 may be reduced. A more preferable total compression rate is 10% or more and 30% or less.

<<Holding Force>>

In the terminal-equipped wire 10 of this example, a holding force, which is a force for holding the conductor 20 by the grip portion 4B of the terminal 4, becomes excessively large. The holding force can be evaluated by a testing device 7 of FIG. 8. The testing device 7 includes a pressing member 70 for coming into contact with the rear end surface of the shell 5 and a chuck 71 for gripping the outer periphery of the wire 2. The pressing member 70 is immovably fixed. The chuck 71 is configured to be movable toward a side (side indicated by a white arrow) away from the terminal 4 in the axial direction of the wire 2. A maximum load when the terminal 4 is fixed by the pressing portion 70 and the wire 2 is pulled at a pull-out speed of 50 mm/min using such a testing device 7 is the holding force. The maximum load is obtained by continuously measuring a load for moving the chuck 71 at a constant speed. In the terminal-equipped wire 10 of this example, this holding force is 20 N or more.

<<State of Bonding Interface Between Conductor and Terminal>>

Figure 9:
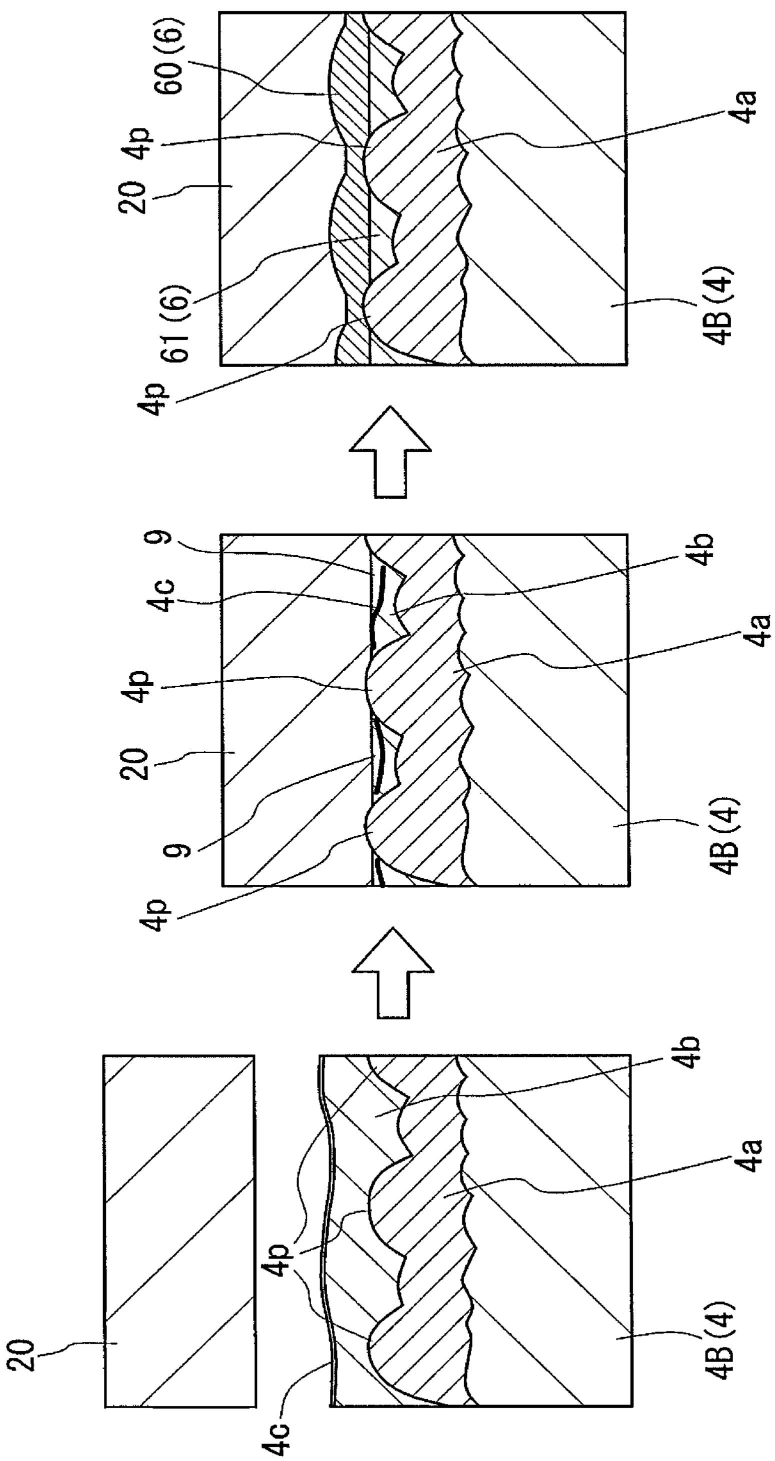
FIG. 9 is an explanatory diagram showing an alloying mechanism in the terminal-equipped wire described in the one embodiment.

In the terminal-equipped wire 10 of this example, an alloy layer is formed between the conductor 20 of the wire 2 and the grip portion 4B of the terminal 4. The alloy layer contains a Cu—Sn alloy formed by alloying Cu and Sn contained in at least one of the conductor 20 and the terminal 4. The alloy layer is formed between the conductor 20 and the grip portion 4B because the grip portion 4B is continuously strongly pressed against the conductor 20. A mechanism for forming the alloy layer is described below on the basis of FIG. 9. FIG. 9 shows state changes of a bonding interface between the conductor 20 and the grip portion 4B with the passage of time indicated by white arrows.

In an example shown in FIG. 9, the conductor 20 and the grip portion 4B of the terminal 4 are simplified to have a rectangular shape. The conductor 20 and the grip portion 4B before bonding are shown in a left figure of FIG. 9, and a state immediately after the conductor 20 and the grip portion 4B are bonded is shown in a middle figure. A state after the passage of a predetermined time following the bonding of the conductor 20 and the grip portion 4B is shown in a right figure of FIG. 9. The conductor 20 shown in the left figure is made of Cu—Ag alloy, and a Sn layer **4*b* is formed on the surface of a Ni base material of the grip portion 4B. The Sn layer 4*b* is a reflow Sn plating layer formed by a reflow process after Sn plating. An oxide film 4*c* is formed on the surface of the Sn layer 4*b* by the natural oxidation of Sn. Further, by performing the reflow process, a Sn—Ni alloy layer 4*a* is formed inside the Sn layer 4*b* by alloying Sn and Ni of the Sn layer 4*b*. The surface of the Sn—Ni alloy layer 4*a* has an uneven shape including locally projecting protrusions 4*p*. The Sn—Ni alloy is, for example, $Ni_3Sn_4$. The hardness of $Ni_3Sn_4$ is higher than that of the Cu alloy constituting the conductor 20**.

As shown in the middle figure of FIG. 9, if the conductor 20 and the grip portion 4B are pressed against each other with a strong force, the oxide film **4*c* of Sn formed on the surface of the Sn layer 4*b* is destroyed and Sn leaks out to the surface of the oxide film 4*c*. As a result, Sn adheres to the surface of the conductor 20 to form adhesion portions 9 and the conductor 20 and the grip portion 4B are bonded. Further, the protrusions 4*p* formed on the Sn—Ni alloy layer 4*a* having a high hardness bite into the conductor 20**.

As shown in the right figure of FIG. 9, if time passes from the bonding, an alloy layer 6 is formed between the conductor 20 and the grip portion 4B. The alloy layer 6 of this example includes a Cu—Sn alloy layer 60 formed on the surface of the conductor 20 and a mixed layer 61. The Cu—Sn alloy layer 60 is formed by the dispersion of Sn adhering to the surface of the conductor 20 at the time of bonding to Cu of the conductor 20. The mixed layer 61 is formed between the Cu—Sn alloy layer 60 formed on the surface of the conductor 20 and the Sn—Ni alloy layer **4*a* formed on the surface of the grip portion 4B. The mixed layer 61** of this example includes a Cu—Sn alloy and a Sn—Ni alloy. The Cu—Sn alloy is, for example, $Cu_6Sn_5$, $Cu_3Sn$ or the like.

Text Example 1-1

Figure 8:
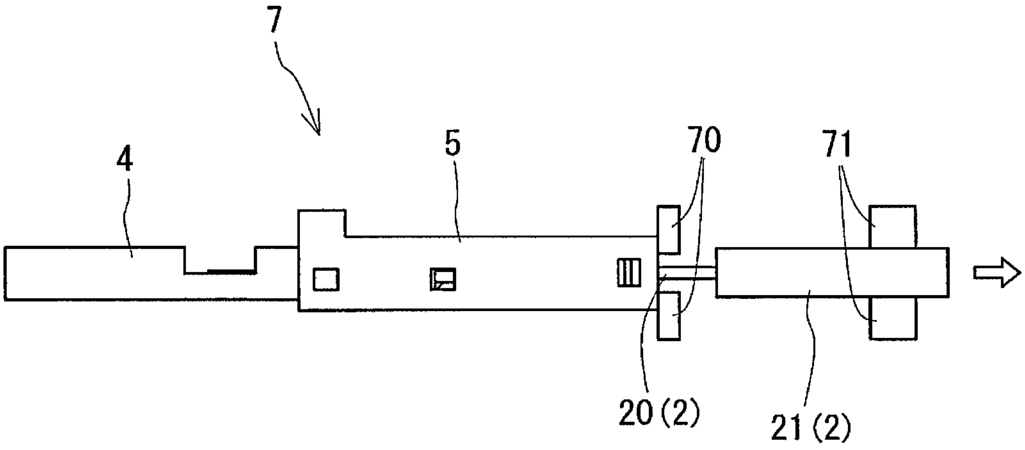
FIG. 8 is a schematic diagram of a device for measuring a holding force for a conductor in the terminal-equipped wire described in the one embodiment.

In test example 1-1, the holding force, which is a force for holding the conductor 20 in the terminal-equipped wire 10 shown in the embodiment, is measured by the testing device 7 shown in FIG. 8.

First, a plurality of single core wires made of Cu—Ag alloy and a plurality of single core wires made of Cu—Ag alloy and having a Sn plating layer were prepared as the conductors 20 of the wires 2. The conductors 20 had a nominal cross-sectional area of 0.13 $mm^2$. Further, a plurality of terminals 4 having Sn plating applied to the Ni base materials and a plurality of shells 5 made of SUS were prepared. The plate material constituting the terminals 4 had a thickness of 0.1 mm A plurality of samples of the terminal-equipped wire 10 obtained by combining these conductors 20, terminals 4 and shells 5 were fabricated. Then, holding forces of the samples immediately after fabrication, left at a room temperature for 24 hrs, left at a room temperature for 120 hrs, left at a room temperature for 168 hrs and held at 120° C. for 120 hrs were measured. A heat treatment at 120° for 120 hrs may be considered as an accelerated test.

First, longitudinal cross-sections of the terminal-equipped wires 10 in the samples immediately after fabrication were observed. This longitudinal cross-section was in a state as shown in a schematic diagram of FIG. 7. The thickness (Y1+Y3) of the grip portion 4B not compressed, the diameter Y2 of the conductor 20 not compressed and the thickness X of the part compressed by the pressing portion 50C in this longitudinal cross-section were measured. As a result, the thickness Y1+Y3, the diameter Y2 and the thickness X were respectively 315 μm, 250 μm and 485 μm. Therefore, the compression rate of this example was {(565−485)/565}×100=14.2%.

Subsequently, the chuck 71 of the testing device 7 of FIG. 8 was pulled at a pull-out speed of 50 mm/min and a load (N) necessary to move the chuck 71 at a constant speed was measured. This load may be considered as the above holding force. Measurement results are compiled in a table of FIG. 10. A horizontal axis of a graph in the table represents a displacement amount (mm) of the chuck 71 and a vertical axis represents the holding force (N). As shown in graphs in this table, in any of the samples, the holding force was peaked at a displacement amount of near 0.3 mm and became zero after a relatively high holding force was maintained from a peak position to a displacement of about 4 mm. The displacement amount of the chuck 71 until the holding force was peaked was due to the elongation of the conductor 20, and the conductor 20 was not pulled out from the terminal 4. Accordingly, it is thought that the holding force showing a peak corresponds to a static friction force and the holding force after the peak corresponds to a dynamic friction force. The holding force was reduced by one stage when the displacement amount increased from 3 mm to about 4 mm because the tip of the conductor 20 had passed through the position of the first thick portion 411 of FIG. 7, and the holding force finally became zero since the conductor 20 was pulled out from the terminal 4.

The holding force of each sample was peaked at 20 N or more. Note that since connector assemblies distributed in the market are not used immediately after fabrication, the holding force of the sample immediately after the conductor 20 is fastened by the shell 5 may be practically negligible.

Figure 10:
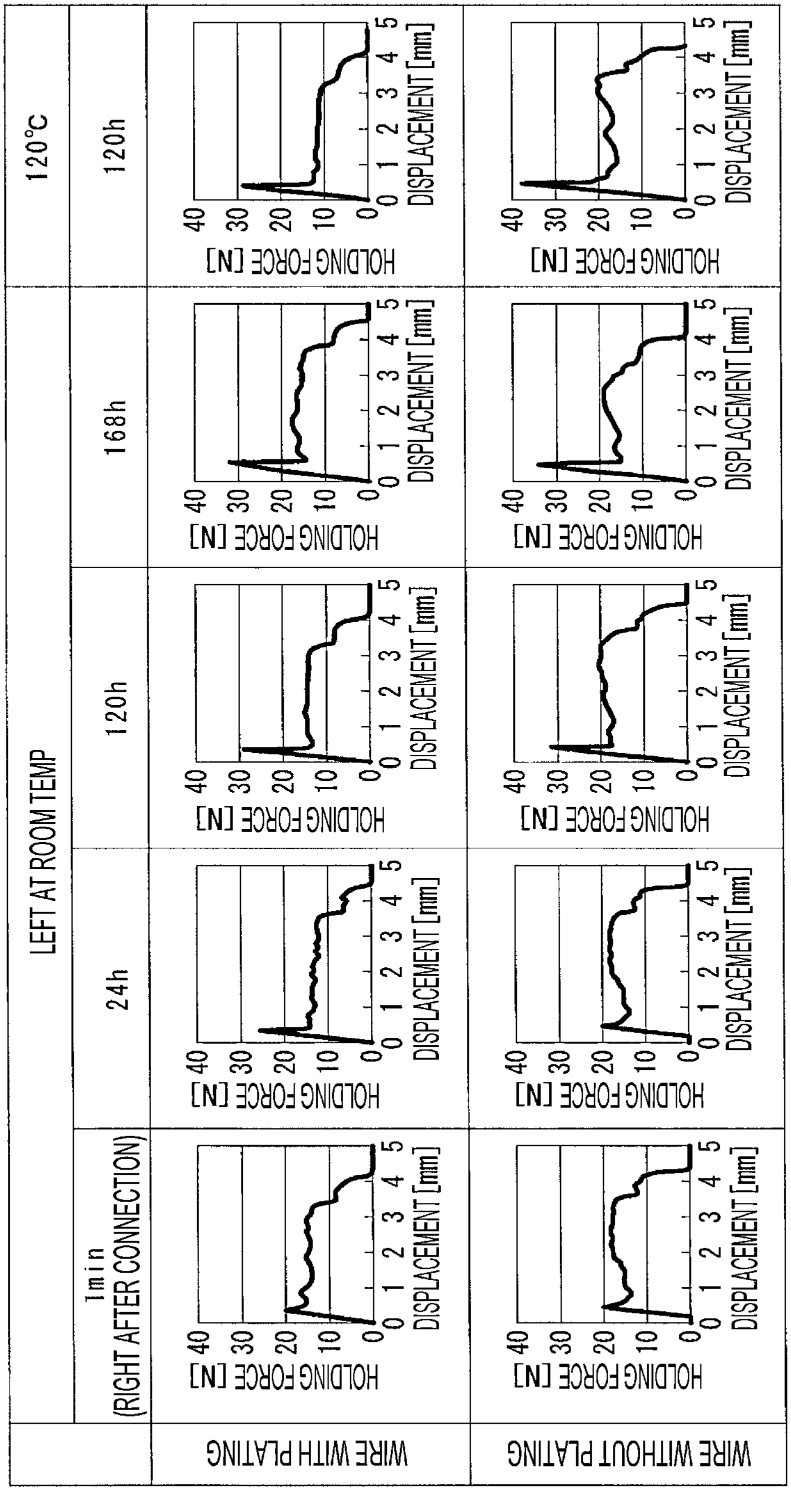
FIG. 10 is a table compiling test results of test example 1-1.

As shown in FIG. 10, it was found that the peak of the holding force tended to be higher as the elapsed time from the fabrication of the sample became longer. From this result, it is inferred that a certain change for increasing the holding force occurs in the bonding interface between the conductor 20 and the grip portion 4B of the terminal 4 with the passage of time. This point was examined in test example 2-1 described later.

It was also found that the plated sample having the Sn plating layer on the surface of the conductor 20 tended to have a lower holding force after the peak than the unplated sample having no Sn plating layer on the surface of the conductor. As compared to the plated sample, pure Sn between the conductor 20 and the grip portion 4B is less in the unplated sample. Pure Sn is thought to have a lubrication effect and reduce a dynamic friction force between the conductor 20 and the grip portion 4B. Therefore, it is inferred that the after-peak holding force of the unplated sample was higher than the after-peak holding force of the plated sample.

Test Example 1-2

In test example 1-2, a test similar to test 1-1 was conducted using conductors 20 made of Cu—Sn alloy and including no plating layer. The terminals 4 and the shells 5 were the same as those used in test example 1-1. The Cu—Sn alloy is softer than the Cu—Ag alloy of test example 1-1. Holding forces were measured for a sample immediately after fabrication and a sample held at 120° C. for 120 hrs.

As a result of the test, the holding force in the sample immediately after fabrication was 30.3 N and the holding force in the sample, for which an accelerated test was conducted, was 32.1 N. It was found that, also in the terminal-equipped wire 10 using the soft conductor 20 made of Cu—Sn alloy, the holding force of the conductor 20 increased by fastening the conductor 20 with a strong force. Since the terminal-equipped wires 10 of test examples 1-1 and 1-2 were confirmed to be excellent in electrical connection reliability since having the excellent holding force.

Test Example 2-1

The following test was conducted to fathom a cause of increasing the static friction forces of the samples with the passage of time in test examples 1-1 and 1-2. First, the terminal-equipped wires 10 were fabricated using the conductors 20, the terminals 4 and the shells 5 used in test example 1-1. The conductors 20 were made of Cu—Ag alloy having no plating layer. Subsequently, after the elapse of a predetermined time following the fabrication of the terminal-equipped wires 10, the terminal-equipped wires 10 were disassembled and the surfaces of the conductors 20 were observed by a SEM (Scanning Electron Microscope). The observed samples were samples immediately after the conductors 20 were fastened by the grip portions 4B, samples left at a room temperature for 120 hrs and samples held at 120° C. for 120 hrs. Observation results are shown in a table of FIG. 11. Deposits were confirmed on the surface of the conductor 20 of each sample. These deposits are inferred to be adhesion portions 9 (see FIG. 9) of Sn derived from the Sn layer 4*b* of the terminal 4.

Taking the SEM results, distributions of elements on the surface of the conductor 20 were examined by EDX (Energy Dispersive X-ray spectrometry). A result of that is shown in a table of FIG. 11. The first row from the top of the table shows SEM images, the second row shows distributions of Sn adhering to the surface of the conductor and the third row shows distributions of Cu on the surface of the conductor.

Figure 11:
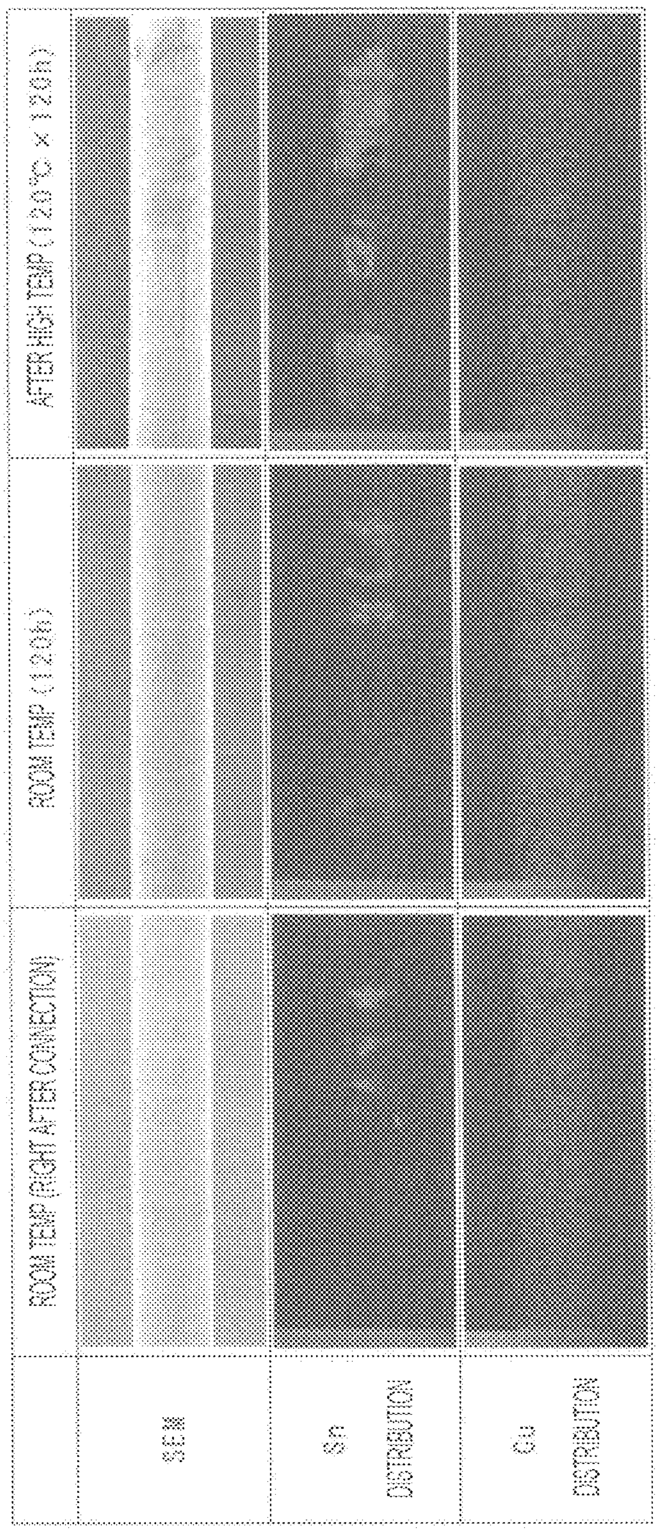
FIG. 11 is a table compiling test results of test example 2-1.

As shown in FIG. 11, it was found that the Sn distribution on the surface of the conductor 20 spread with the passage of time. Since the oxide film 4*c* is formed on the surface of the Sn layer 4*b* provided in the terminal 4 by natural oxidation, Sn of the Sn layer hardly adheres to the surface of the conductor 20 by merely crimping the terminal 4 to the conductor 20. On the other hand, in the sample of this example, the conductor 20 continues to be sandwiched with a strong force by the first and second plate-like pieces 41, 42 of the terminal 4. Thus, Sn adhering to the surface of the conductor 20 in the sample of this example is thought to be the adhesion portions 9 formed by part of Sn contained in the Sn layers 4*b* of the plate-like pieces 41, 42 and leaked out to the surface of the conductor 20 through the oxide film 4*c*. Further, since the distribution of Sn spreads with the passage of time, an increase in the area of the adhesion portions 9 of Sn is inferred to improve the static friction force in test examples 1-1 and 1-2.

Subsequently, the area of the adhesion portions 9 on the surface of the conductor 20 was obtained by calculation. Specifically, the diameter of the conductor 20 was obtained from the SEM images shown in FIG. 11 and a visual field width (length in the same direction as the diameter) in which Cu was detected was obtained from the images showing the Cu distribution. In this example, the diameter was 267 μm and the visual field width was 248 μm. The visual field width in which Cu is detected is a width in which the elements can be analyzed by EDX. That is, the elements can be analyzed in a 93% region of the surface of the conductor 20. Parts which cannot be analyzed are end parts of the conductor 20 not in contact with the plate-like pieces 41, 42 having the Sn layer 4*b*. Thus, the Sn distribution of the conductor 20 analyzed by EDX can be regarded as a Sn distribution in the entire conductor 20. Accordingly, an area of Sn occupied in the visual field width was obtained by an image analysis. As a result, the areas of the adhesion pans 9 of Sn in the samples immediately after fabrication, the samples left at a room temperature for 120 hrs and the samples held at 120° C. for 120 hrs were respectively 0.058 $mm^2$, 0.074 $mm^2$ and 0.119 $mm^2$. These measured areas are areas on one sides of the conductors 20. A total area of the adhesion portions 9 in each sample including both sides of the conductor 20 is about twice as large as the above measured area. Although not shown in this specification, about the same adhesion portions 9 as on the side shown in FIG. 11 were formed also on a side of the conductor 20 opposite to the side shown in FIG. 11. That is, the area of the adhesion portions 9 of Sn on the surface of the conductor 20 was 100 $mm^2$ or more in the configuration in which the conductor 20 continued to be sandwiched with a strong force by the two plate-like pieces 41, 42.

Test Example 2-2

Figure 12:
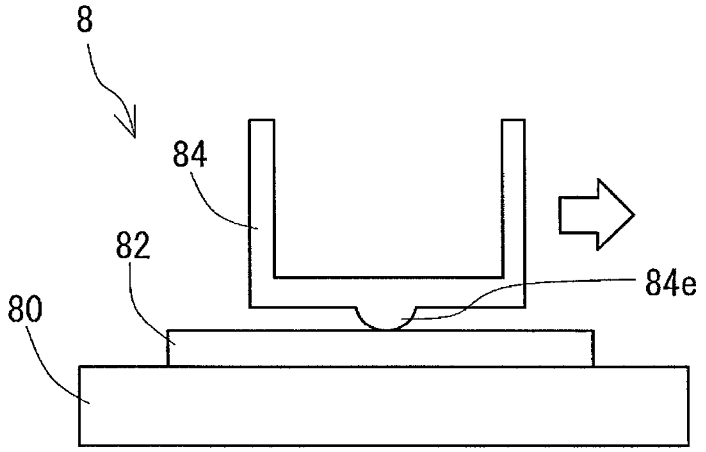
FIG. 12 is a schematic diagram of a testing device described in test example 2-2.

As shown in test example 2-1, an increase in the holding force for the conductor 20 by the grip portion 4B is inferred to be caused by the adhesion of Sn. To confirm a causal relationship of the holding force and the adhesion of Sn, a test was conducted using a testing device 8 shown in FIG. 12. The test was conducted at a room temperature.

In the test using the testing device 8, a plate member 82 made of Sn and a sliding member 84 made of Sn were first prepared. Subsequently, the plate member 82 was placed on a base 80 and an emboss 84*e* of the sliding member 84 was pressed against the plate member 82. A radius of the emboss 84*e* was 1 mm A vertical load applied to the sliding member 84 was 1 N, 2 N or 4 N. A time for pressing the emboss 84*e* was 1 min, 16 hrs or 64 hrs. As a time for applying the vertical load to the sliding member 84 becomes longer, more Sn of the plate member 82 adheres to the emboss 84*e*.

After the elapse of a predetermined time, the sliding member 84 was moved in a horizontal direction while the vertical load was applied to the sliding member 84. A force (N) for moving the sliding member 84 in the horizontal direction was measured as a friction force and a friction coefficient was obtained by dividing the friction force by the vertical load. Graphs showing a relationship of a displacement amount (mm) in the horizontal direction of the sliding member 84 and the friction coefficient are compiled in a table of FIG. 13. A horizontal axis of the graph represents the displacement amount and a vertical axis thereof represents the friction coefficient.

Figure 13:
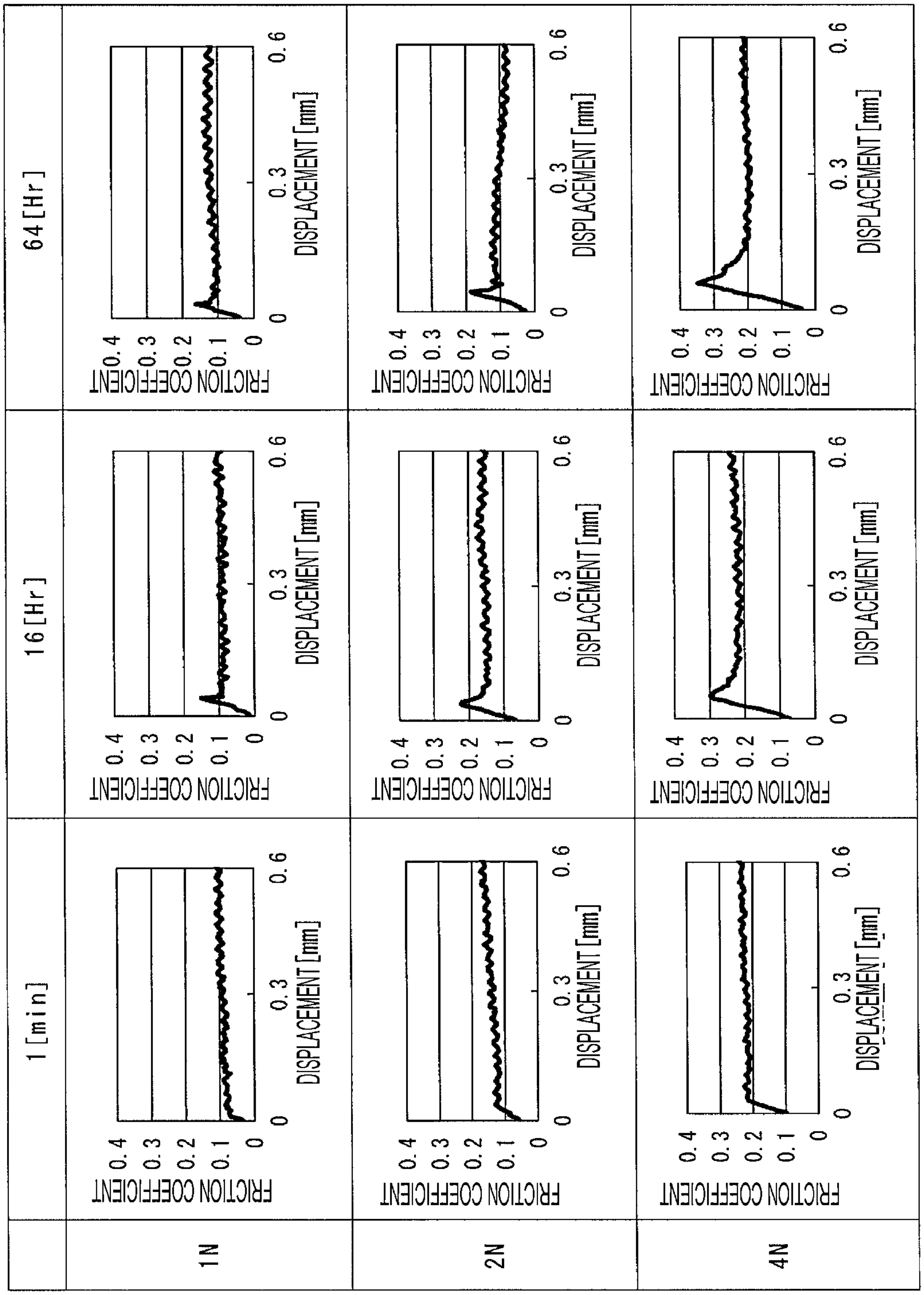
FIG. 13 is a table compiling test results of test example 2-2.

As shown in FIG. 13, it was found that a peak of the friction coefficient of the sliding member 84 increased as a time for applying the vertical load increased. The peak of the friction coefficient is a static friction coefficient. Since the test was conducted at a room temperature, an increase of the friction coefficient is thought to derive from an increase in the adhered amount of Sn.

Further, as shown in FIG. 13, it was found that the peak of the friction coefficient of the sliding member 84 increased as the vertical load increased. That is, it was found to be necessary to continue to press the grip portion 4B against the conductor 20 with a strong force in order to obtain a sufficient holding force in the terminal-equipped wire 10 shown in FIG. 6. A sufficient holding force cannot be obtained by merely sandwiching the conductor 20 by the grip portion 4B.

Test Example 3

Next, states of the bonding interfaces between the plate-like pieces 41, 42 of the grip portions 4B and the conductors 20 in the samples of test example 1-1 were confirmed in SEM images. Further, the compositions of the bonding interfaces were examined by EDX.

Figure 14:
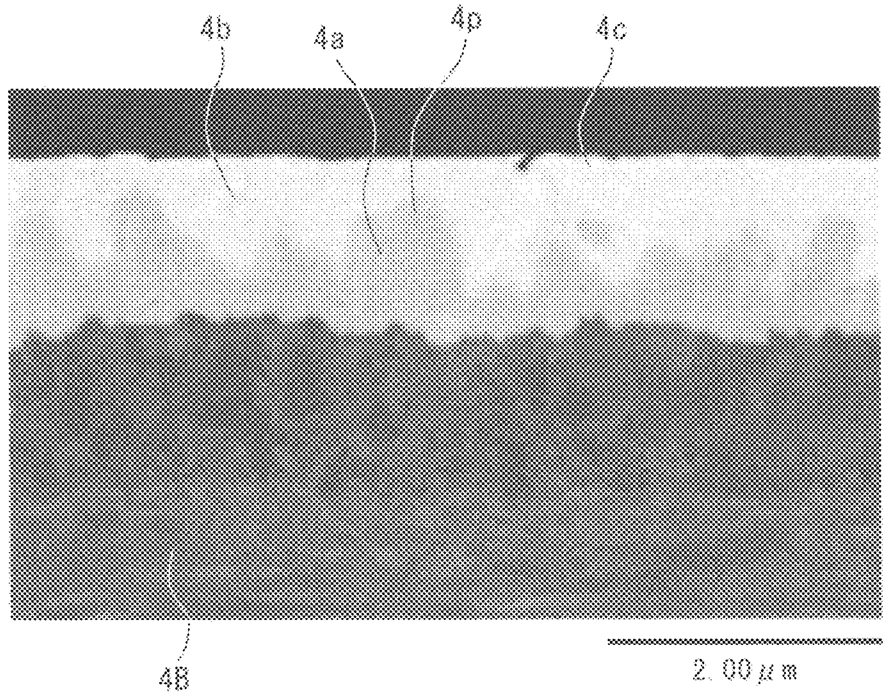
FIG. 14 is a view showing a SEM image of a cross-section of a terminal described in test example 3.

FIG. 14 is a cross-sectional picture of the grip portion 4B of the terminal 4 before being connected to the conductor 20. In this terminal 4, the Sn layer 4*b* is formed on the surface of the Ni base material. An upper side of FIG. 14 is a surface of the grip portion 4B. A dark grey part on a lower side of FIG. 14 is the Ni base material, and a second darkest grey part formed on the Ni base material is the Sn—Ni alloy layer 4*a*. The Sn—Ni alloy is $Ni_3Sn_4$. The surface of the Sn—Ni alloy layer 4*a* has an uneven shape including the locally projecting protrusions 4*p*. In this example, the reflow process is performed after the Sn layer 4*b* is formed, and the protrusions 4*p* of the Sn—Ni alloy layer 4*a* are formed by this reflow process. A light grey part formed on the Sn—Ni alloy layer 4*a* is the Sn layer 4*b*. The oxide film 4*c* formed by the natural oxidation of Sn is formed on the surface of the Sn layer 4*b*.

Figure 15:
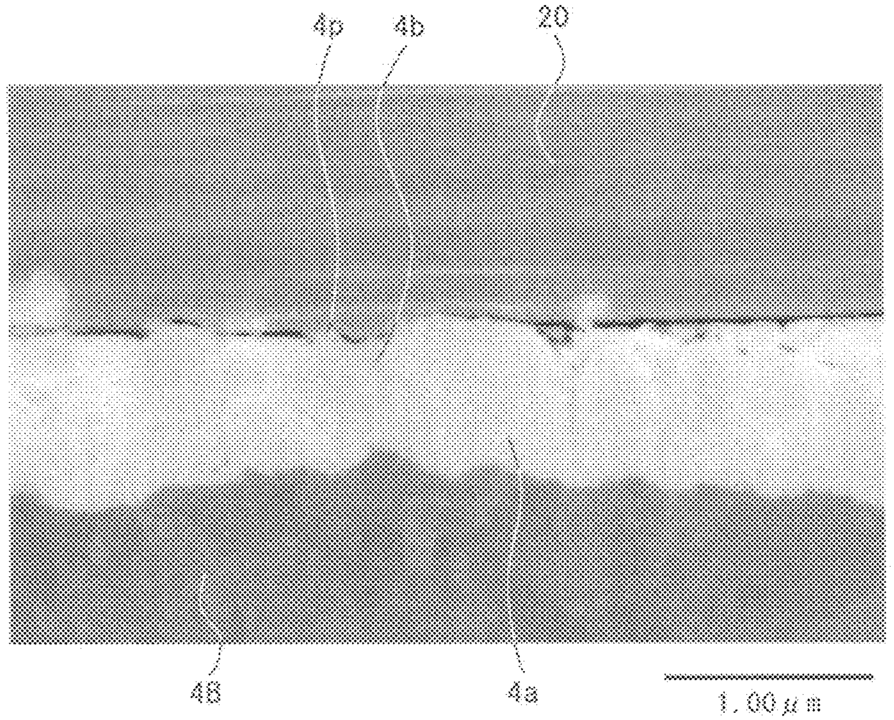
FIG. 15 is a view showing a SEM image of a cross-section of a sample described in test example 3 immediately after fabrication.

FIG. 15 is a cross-sectional picture of the bonding interface immediately after the conductor 20 and the grip portion 4B were bonded. A grey part on upper side of FIG. 15 is the conductor 20. The conductor 20 of this example is the conductor 20 made of Cu—Ag alloy and having no Sn plated. Since the conductor 20 is sandwiched with a strong force by the grip portion 4B in this example, the Sn layer 4*b* flows in a planar direction to become thinner. At that time, the oxide film 4*c* (FIG. 9) of the Sn layer 4*b* is broken and Sn contained in the Sn layer 4*b* leaks out to the conductor 20 and adheres to the conductor 20. Sn adhering to the conductor 20 (adhesion portions 9 of FIG. 9) contributes to improving the holding force for the conductor 20 as already described. Further, the protrusions 4*p* of the Sn—Ni alloy layer 4*a* are pierced through the thinned Sn layer 4*b* and bite into the surface of the conductor 20. This biting becomes mechanical hooking. Therefore, this biting is also inferred to contribute to improving the holding force for the conductor 20.

Figure 16:
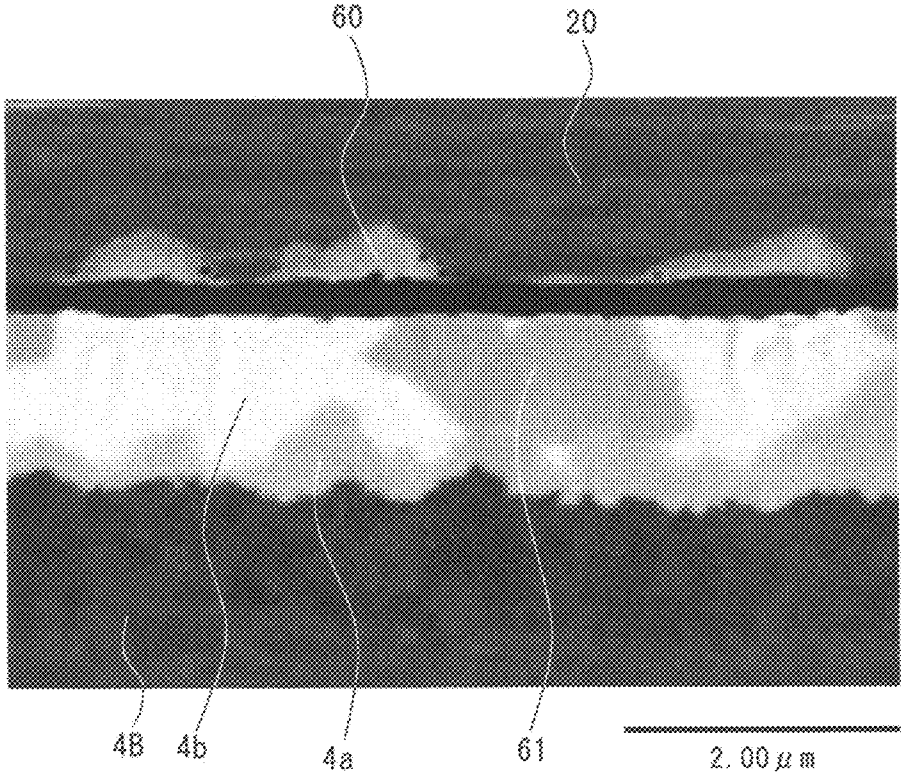
FIG. 16 is a view showing a SEM image of a cross-section of a sample described in test example 3 held at a high temperature for a short period of time.

FIG. 16 is a cross-sectional picture of the sample for which the accelerated test of holding the sample at 120° C. for 20 hrs after fabrication was conducted. In this cross-sectional picture, a light grey part is formed on the surface of the conductor 20. This light grey part is the Cu—Sn alloy layer 60. The Cu—Sn alloy layer 60 is formed by the reaction of Sn adhering to the surface of the conductor 20 with Cu contained in the conductor 20. Further, the mixed layer 61 in which the unreacted Sn, the Cu—Sn alloy and the Sn—Ni alloy were mixed was formed between the Cu—Sn alloy layer 60 and the Sn—Ni alloy layer 4*a*.

Figure 17:
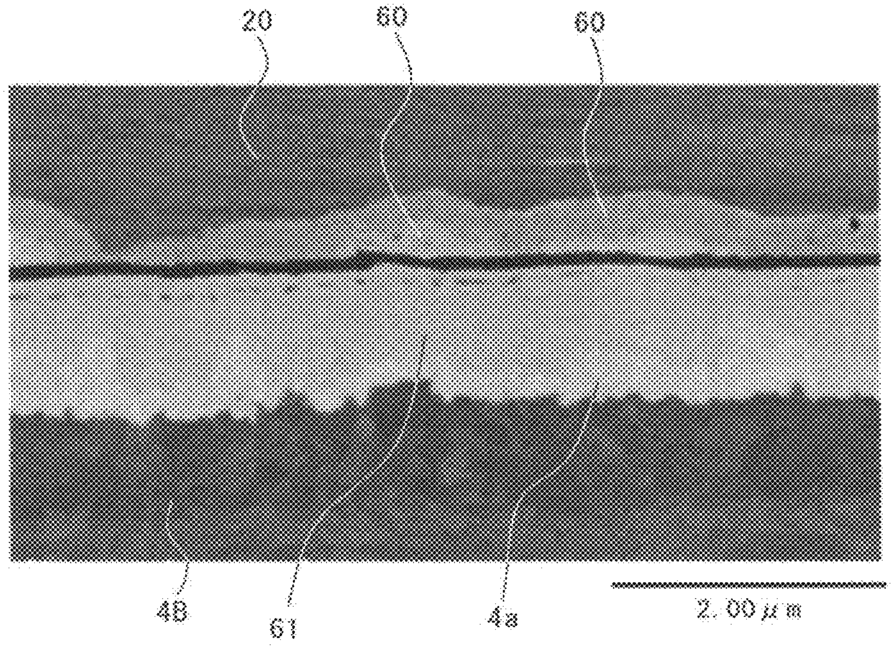
FIG. 17 is a view showing a SEM image of a cross-section of a sample described in test example 3 held at a high temperature for a long period of time.

FIG. 17 is a cross-sectional picture of the sample for which the accelerated test of holding the sample at 120° C. for 120 hrs after fabrication was conducted. In this cross-sectional picture, the mixed layer 61 was formed between the Cu—Sn alloy layer 60 and the Sn—Ni alloy layer 4*a* and there was no more unreacted Sn. Out of the mixed layer 61, a dark part on the side of the conductor 20 is a $Cu_3Sn$ alloy and a light part on the side of the grip portion 4B is $Cu_6Sn_5$.

From the above results, it was found that Sn adhering to the surface of the conductor 20 from the grip portion 4B was alloyed with the passage of time.

LIST OF REFERENCE NUMERALS

1 connector assembly
10 terminal-equipped wire

2 wire
20 conductor, 21 insulation layer
3 connector
3A front housing, 3B rear cover
30 insertion hole, 31 housing-side engaging portion, 32 cover-side engaging portion
31*f* first projection, 31*s* second projection
33 partition wall, 34 cavity, 35 slide groove, 36 through window
4 terminal
4*a* Sn—Ni alloy layer, 4*b* Sn layer, 4*c* oxide film, 4*p* protrusion
4A terminal connecting portion, 4B grip portion
40 insertion hole, 41 first plate-like piece, 42 second plate-like piece, 44 serration
45 terminal-side engaging portion, 46 through window
410 first thin portion, 411 first thick portion
420 second thin portion, 421 second thick portion
5 shell
50 tubular portion, 50C pressing portion, 50*d* step portion
51 first projecting portion, 52 second projecting portion, 53 guide portion
55 shell-side engaging portion, 55*f* first engaging portion, 55*s* second engaging portion
6 alloy layer
60 Cu—Sn alloy layer, 61 mixed layer
7 testing device
70 pressing member, 71 chuck
8 testing device
80 base, 82 plate member, 84 sliding member, 84*e* emboss
9 adhesion portion

What is claimed is:

1. A terminal-equipped wire, comprising:
a wire including a conductor;
a terminal to be connected to the conductor; and
a shell to be mounted on the terminal,
wherein:
the terminal includes a grip portion for sandwiching the conductor,
the shell includes a pressing portion for pressing at least a part of the grip portion toward the conductor,
the grip portion has a Sn—Ni alloy layer containing $Ni_3Sn_4$,
the Sn—Ni alloy layer includes locally projecting protrusions, and
the protrusions bite into the conductor.

2. The terminal-equipped wire of claim 1, wherein the conductor is a single core wire.

3. The terminal-equipped wire of claim 1, wherein the conductor is made of Cu—Sn alloy or Cu—Ag alloy.

4. The terminal-equipped wire of claim 1, wherein the shell includes:
a tubular portion for accommodating the grip portion inside; and
the pressing portion formed on the tubular portion.

5. A terminal-equipped wire, comprising:
a wire including a conductor;
a terminal to be connected to the conductor; and
a shell to be mounted on the terminal,
wherein:
the terminal includes a grip portion for sandwiching the conductor,
the shell includes a pressing portion for pressing at least a part of the grip portion toward the conductor,
the grip portion has a Sn—Ni alloy layer,
the Sn—Ni alloy layer includes locally projecting protrusions,
the protrusions bite into the conductor,
the shell includes:
a tubular portion for accommodating the grip portion inside; and
the pressing portion formed on the tubular portion,
the grip portion includes a first plate-like piece and a second plate-like piece facing each other across the conductor,
the pressing portion includes a first projecting portion and a second projecting portion projecting toward an inner peripheral side of the tubular portion,
the first projecting portion presses the first plate-like piece toward the second plate-like piece, and
the second projecting portion presses the second plate-like piece toward the first plate-like piece.

* * * * *